(12) United States Patent
Hajianpour

(10) Patent No.: US 8,104,145 B1
(45) Date of Patent: Jan. 31, 2012

(54) LEASH HANDLE WITH STORAGE DRAWER AND SWIVEL CONNECTION

(75) Inventor: Zoya Hajianpour, Fort Lauderdale, FL (US)

(73) Assignee: Zoya, Inc., Fort Lauderdale, FL (US)

( * ) Notice: Subject to any disclaimer, the term of this patent is extended or adjusted under 35 U.S.C. 154(b) by 0 days.

(21) Appl. No.: 12/655,484

(22) Filed: Jan. 2, 2010

(51) Int. Cl.
*B25G 1/04* (2006.01)

(52) U.S. Cl. .......................... 16/428; 119/772; 119/795

(58) Field of Classification Search ............... 16/428, 16/430, 111.1; 403/109.2, 109.8; 119/775, 119/795, 796, 772; 294/1.3, 1.4; 224/103; 150/109

See application file for complete search history.

(56) References Cited

U.S. PATENT DOCUMENTS

| 5,127,762 A * | 7/1992 | Havlovitz ..................... 403/298 |
| 5,361,726 A * | 11/1994 | Harris et al. .................. 119/797 |
| 5,517,885 A * | 5/1996 | Feng ............................. 81/177.4 |
| 5,675,866 A * | 10/1997 | Tseng .......................... 16/111.1 |
| 5,852,988 A * | 12/1998 | Gish ............................. 119/795 |
| 5,901,668 A * | 5/1999 | Goodger, Sr. ................. 119/795 |
| 6,240,881 B1 | 6/2001 | Edwards et al. |
| 6,539,897 B1 | 4/2003 | Dossenback |
| 6,592,231 B2 * | 7/2003 | Home et al. .................. 359/841 |
| 6,626,132 B1 | 9/2003 | Mann |
| 6,688,259 B2 * | 2/2004 | Axel ............................. 119/792 |
| 7,047,604 B2 * | 5/2006 | Axel ............................. 24/599.1 |
| 7,114,196 B1 * | 10/2006 | Cicio ............................... 2/338 |
| 7,194,982 B2 | 3/2007 | Edwards |
| 7,506,615 B1 | 3/2009 | Sansone et al. |
| D613,583 S * | 4/2010 | Abels ............................ D8/356 |
| 2004/0094000 A1 * | 5/2004 | Liao ............................... 81/490 |
| 2006/0219182 A1 | 10/2006 | Rabello |
| 2006/0272595 A1 * | 12/2006 | Edwards ....................... 119/795 |
| 2008/0216767 A1 | 9/2008 | Wang |

FOREIGN PATENT DOCUMENTS

EP  1 195 469 A1  4/2002
WO  WO 2009/005478 A1  1/2009

* cited by examiner

*Primary Examiner* — Victor Batson
*Assistant Examiner* — Matthew Sullivan
(74) *Attorney, Agent, or Firm* — Ronald V. Davidge

(57) ABSTRACT

A leash handle includes rigid housing including a generally cylindrical graspable portion having a cavity holding a drawer for holding items, such as bags for cleaning animal waste. The drawer can be slid between a closed position, within the housing, and an open position, extending outward from the housing. A member for holding one or more individual animal leashes is pivotally mounted on the housing.

2 Claims, 2 Drawing Sheets

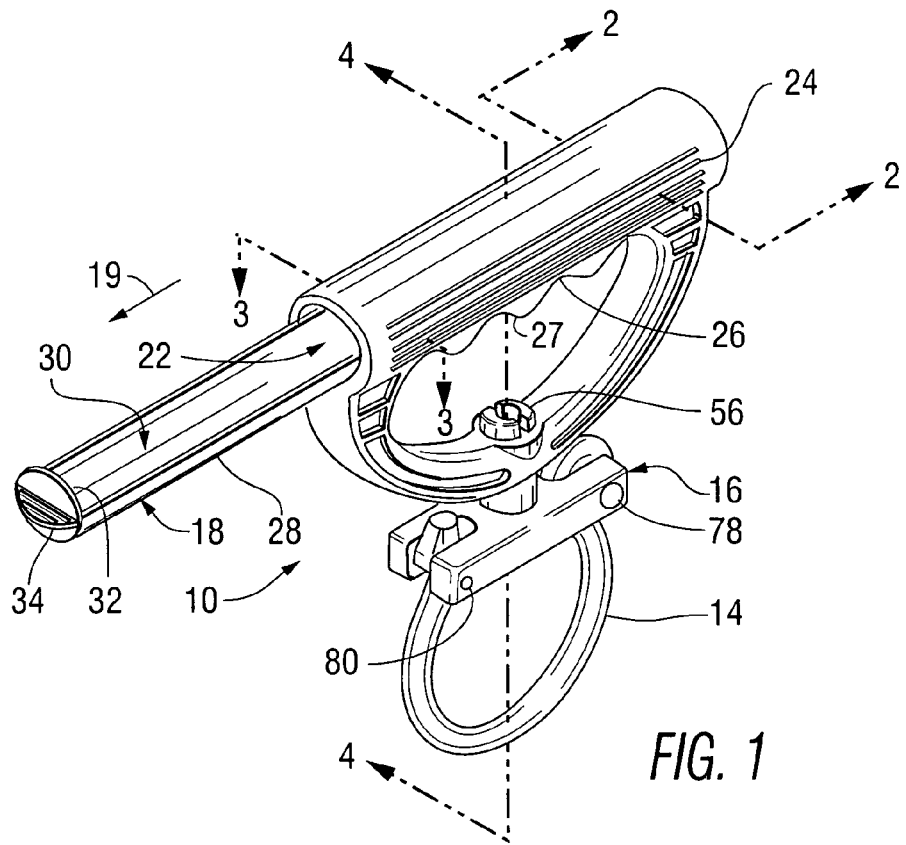
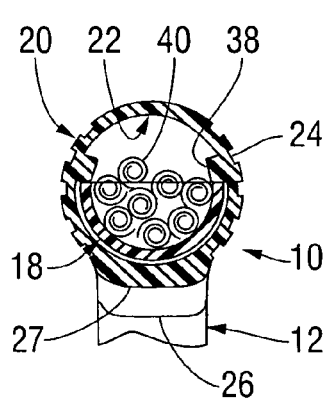
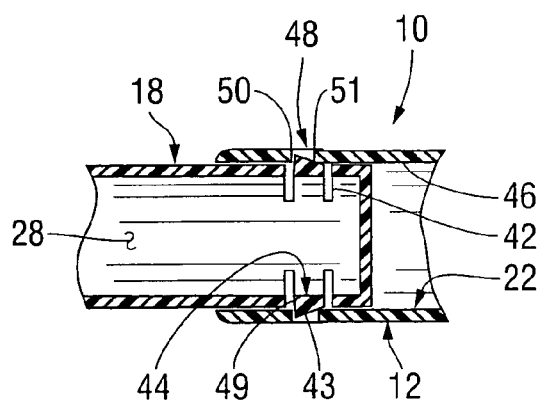

LEASH HANDLE WITH STORAGE DRAWER AND SWIVEL CONNECTION

RELATED APPLICATIONS

Not Applicable

FEDERALLY SPONSORED RESEARCH OR DEVELOPMENT

Not Applicable

BACKGROUND OF THE INVENTION

1. Field of the Invention

This invention relates to a handle for holding one or more animal leashes, and, more particularly to such a handle including a provision for the storage of items, such as plastic bags for waste disposal, and further including a swivel arrangement between a graspable portion of the handle and an elongated member to which the leashes are attached.

2. Summary of the Background Information

Pet owners face an increasing need to remove and properly dispose solid waste left by their animals, particularly, but not exclusively, dogs, during walks. In urban and suburban areas, ordinances often require such removal and disposal. Furthermore, to an increasing extent, proper disposal of such waste requires that the waste must be placed in sealed containers, such as plastic bags with closures, before being placed in a trash receptacle, to remain segregated from other garbage or trash during its preparation for recycling.

A number of devices have been developed to assist pet owners in the removal of solid waste material left by their animals, and many of such devices are described in the patent literature. Such devices include scoops and tongs of various types and various bag containers for holding bags to be used in the removal and disposal process. Such bag containers may be incorporated in an assembly including a pet leash. For example, a rotatably mounted spool including a number of plastic bags releasably attached to one another in an end-to-end configuration is mounted within or below a handle structure including a graspable portion and means for attaching a leash. Such a spool may be covered by an end cap having an aperture through which the bags can be individually pulled to be detached from the remaining bags, or the rigid housing holding the spool may be provided with a slot allowing the removal of individual bags. Alternately, a bag container may be formed in a curved shape to fit below a rounded container holding the spiral form of a retractable leash within a handle. Such a container holds a number of bags folded together or attached to one another by perforations, allowing the bags to be individually removed through a slot within the container and separated from the bags remaining in the container. In another configuration, a handle is provided with a cylindrical holder extending transversely between the graspable portion of the handle and a point at which a leash is attached to the handle. The holder may include a roll of bags, having a center from which individual bags are pulled, and a collapsible water bowl. In yet another configuration, a screw-on container is attached to each side of a handle to which a leash is attached. The containers may be used for water and dog food, for clean-up bags, or for other items.

Animal waste collection and disposal systems include a graspable portion, means for the attachment of a leash, bags for waste storage and disposal, and a collection device, operable with the bags for picking up solid waste to be held within the bags. For example, the collection device may comprise a pair of tongs having flattened portions extending to inward-facing lips, that are inserted between an outer cover of one of the bags and the bag itself, so that, when the tongs are held open, the bag is opened to receive waste picked up using the tongs. Alternately, the collection device may comprise a small box that is placed over the waste, with the box being actuated by a button to move downward with the help of springs and lateral guides and to open for collection of the waste within a plastic bag in the small box.

Many people, including owners of multiple pets and professional dog walkers, walk multiple pets simultaneously on multiple leashes attached to a single leash handle. Since multiple pets tend to fan outward on a generally flat ground surface the individual leashes are expected to fan outward, forming a pattern that is readily accommodated by a horizontally extending elongated member to which the individual leases are attached. The patent literature includes a number of descriptions of multi-pet leashes including a single leash handle, an intermediate leash, and a swivel connecting the intermediate leash to two or more individual leashes. The swivel allows the hardware attached to the individual leashes to assume an orientation in response to the movement of the pets, while the person holding the leash can orient the leash handle for his own comfort.

SUMMARY OF THE INVENTION

In accordance with one aspect of the invention, a leash handle is provided, with the leash handle including a rigid housing, a leash attachment member, and a drawer. The rigid housing in turn includes a generally cylindrical graspable portion and a cavity. The drawer is slidably mounted in the cavity within the rigid housing to be moved from a closed position within the cavity to an open position, extending outward from the cavity to outwardly dispose an opening within the drawer. The leash attachment member provides for the attachment of at least one individual animal leash.

In accordance with another aspect of the invention, a leash handle is provided, with the leash handle including a rigid housing, and a leash attachment member, pivotally mounted on the rigid housing. Again, the leash attachment member provides for the attachment of at least one individual animal leash.

Preferably, the cavity within the rigid housing extends within the generally cylindrical graspable portion, including an open end, a closed end, an arcuate lower surface, and a pair of rail surfaces extending along the cavity, above the arcuate lower surface. Then, the drawer comprises a tray with an arcuate surface extending to the opening within the drawer below the rails, an inner end extending to the opening within the drawer, and an outer end filling the open end of the cavity with the drawer in the closed position.

Preferably, the drawer additionally includes a latching block and a flexible member, while the cavity within the rigid housing additionally includes a slot. The latching block has a latching surface and an inclined surface, which the flexible member holds against the cavity within the rigid housing to slide along the cavity as the drawer is moved between the closed position and the open position. The slot within the cavity is engaged by the latching block as the drawer is moved into the open position, with the latching surface of the latching block moving into contact with an outer edge of the slot to prevent further outward movement of the drawer within the cavity as the latching block engages the slot. Then, as the drawer is moved inward from the open position, the inclined surface of the latching block slides along the inner edge of the slot.

The leash attachment member may be attached to a swivel connection block including a pivot shaft pivotally mounted within the pivot hole of the rigid housing. The swivel connection block may additionally include a pivot pin and a latching pin, with the leash attachment member including a pivot end, pivotally mounted on the pivot pin to provide for movement of the leash attachment member between an open position and a closed position, and a latching end, engaging the latching pin to hold the leash attachment member in the closed position. Then, a plurality of individual animal leashes may be attached to the leash attachment member and removed from the leash attachment member in the open position, while the individual animal leashes are held on the leash attachment member in the closed position.

BRIEF DESCRIPTION OF THE FIGURES

FIG. 1 is a perspective view of a leash handle built in accordance with the invention;

FIG. 2 is a fragmentary cross-sectional elevation of the leash handle of FIG. 1, taken as indicated by section lines 2-2 therein to show a drawer held within a rigid housing thereof;

FIG. 3 is a fragmentary cross-sectional plan view of the leash handle of FIG. 1, taken as indicated by section lines 3-3 therein to show means for holding the drawer to extend from the rigid housing.

DETAILED DESCRIPTION OF THE INVENTION

Figure 4:
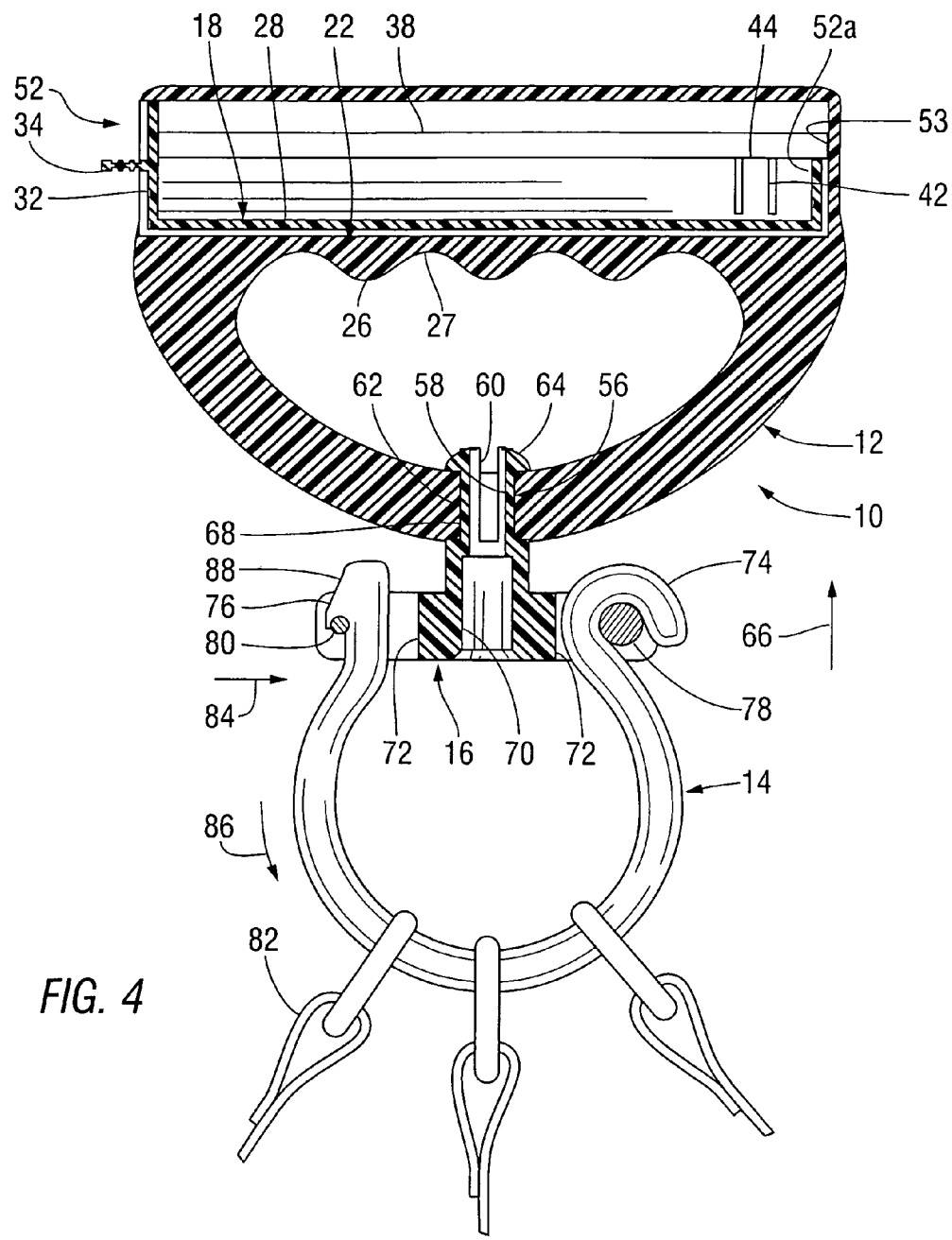
FIG. 4 is a cross-sectional elevation of the leash handle of FIG. 1, taken as indicated by section lines 4.4 therein to show the drawer and a swivel connection therein for the attachment off one or more individual leashes.

FIG. 1 is a perspective drawing of a leash handle 10 built in accordance with the invention to include a rigid housing 12, an elongated leash attachment member 14 pivotally attached to the rigid housing 10 by means of a swivel connection block 16, and a drawer 18, which is shown in an open position, being held to extend outward, in the direction of arrow 19, from the rigid housing 12. The rigid housing 12 includes a generally cylindrical graspable portion 20, which in turn includes a cavity 22 provided for holding the drawer 18. The generally cylindrical graspable portion 20 additionally includes external features to facilitate manually holding the leash handle 10, such as grooves 24 and protrusions 26 extending between spaces 27 provided for individual fingers of a hand (not shown) holding the graspable portion 20. The drawer 18 includes an arcuate tray 28, extending upward to an opening 30, and an end 32, which may be pulled outward using a tab 34.

FIG. 2 is a fragmentary cross-sectional elevation of the leash handle 10, taken as indicated by section lines 2-2 in FIG. 1 to show the drawer 18 as held in the closed position within the cavity 22 in the generally cylindrical graspable portion 20. The cavity 22 is provided with a pair of rails 38 extending above the drawer 18 to hold the drawer 18 in place, while allowing the drawer 18 to be slid in the direction of arrow 19 and opposite thereto. For example, the drawer 18 is used to hold a number of rolled plastic bags 40, which are then used for the disposal of waste from an animal being walked on a leash attached to the elongated leash attachment member 14.

FIG. 3 is a fragmentary cross-sectional plan view of the leash handle 10, taken as indicated by section lines 3-3 in FIG. 1 to show means for holding the drawer 18 in an open position, extending outward from the rigid housing 12, as shown in FIG. 1. The arcuate tray 28 of the drawer 18 includes a pair of flexible sections 42, which extend upward to hold an inclined surface 43 of a latching block 44, disposed at the upper end of each flexible section 42, against an adjacent surface 46 of the cavity 22. As the drawer 18 is moved outward, in the direction of arrow 19 into the open position, these latching blocks 44 move into slots 48 within the adjacent surfaces 46, with a latching surface 49 of each latching block 44 engaging a first surface 50 of an adjacent slot 48 to prevent further outward movement of the drawer 18 so that the drawer 18 is held in open position. When the drawer 18 is then pushed back, opposite the direction of arrow 19, into the cavity 22, inclined surfaces 43 of the latching blocks 44 slide along second edges 51 of the slots 48, so that the drawer 18 can be slid inward, opposite the direction of arrow 19.

FIG. 4 is a cross-sectional elevation of the leash handle 10, taken as indicated by section lines 4-4 in FIG. 1 to show the drawer 18 as held fully within the cavity 22, with the end 32 of the drawer 18 closing an open end 52 of the cavity 22, and with an inner end 52a of the drawer 18 disposed adjacent a closed end 53 of the cavity 22. The drawer 18 provides the present invention with an advantage over prior art leash handles that are particularly configured to dispense bags for waste removal in that the drawer 18 can be used to hold waste removal bags 40 or for other purposes.

FIG. 4 additionally shows elements within the swivel connection block 16, by which the leash attachment member 14 is pivotally attached to the rigid housing 12. The swivel connection block 16 includes a pivot shaft 56, which is hollow, including an internal hole 58, and which is additionally bifurcated by a slot 60 to form a pair of flexible sections 62 extending to beveled tip sections 64. The swivel connection block 16 is assembled to the rigid housing 12 by pushing the flexible sections 62 upward, in the direction of arrow 66, through a hole 68 within the rigid housing 12. For example, a tool (not shown) may be inserted into an enlarged portion 70 of the internal hole 58 to push the flexible sections 62 into the hole 68. The swivel connection block 16 also includes a pair of end slots 72 holding a pivot end 74 and a latching end 76 of the leash attachment member 14. The pivoting end 74 extends around a pivot pin 78, while the latching end 76 is latched by a latching pin 80. Both the pivot pin 78 and the latching pin 80 are fastened in place within the swivel connection block 16.

When the leash attachment member 14 is closed, as shown in FIG. 4, one or more individual animal leashes 82 can be held. The leash attachment member 14 is opened by pushing the latching end 76 inward, in the direction of arrow 84, to be released from the latching pin 80, and by then moving the leash attachment member 14 to pivot downward, in the direction of arrow 86, about the pivot pin 78. With the leash attachment member 14 open, individual animal leashes 82 can be added or removed. Then, the leash attachment member 14 is closed by being pivoted upward, opposite the direction of arrow 86, with contact between an inclined surface 88 of the latching end 76 and the latching pin 80 causing inward movement, in the direction of arrow 84, of the latching end 76, past the latching pin 80 to be held in place on the latching pin 80 as shown in FIG. 4. With the leash attachment member 14 closed, the individual animal leashes 82 are retained on the leash attachment member 14.

The swiveling motion provided by rotation of the pivot shaft 56 of the swivel connection block 16 within the hole 68 of the rigid housing 12 allows the leash attachment member 18 to move into an orientation provided by the movement of animals attached to the leashes 82, while the rigid housing 12 is moved into an orientation desired by the person holding the generally cylindrical graspable portion 20. For example, if multiple animals attached to the leashes 82 fan outward along the ground, the leash attachment member 18 will pivot into a horizontal orientation, while the person may pivot the rigid housing 12 so that the cylindrical graspable portion 20 is disposed horizontally or vertically, according to his preference. In this regard, it is noted that the rigid housing 12 can be held and used in any orientation. Directional references used herein, such as "upward" and "downward," are given according to the orientation of the drawings, not according to an orientation of expected use.

Because the lease attachment member 14 is pivotally attached directly to the rigid housing 12 by the swivel connection block 16, an intermediate leash segment extending between a handle and a swivel connection within prior art leashes for walking multiple animals is not required in the present invention. This arrangement allows the present invention to be used with multiple individual leashes or with a single leash without a need to incorporate an additional leash segment, which is not needed for use with a single leash.

While a preferred embodiment of the present invention has been described with a degree of particularity, it is understood that this description has been only been given as an example, and that many variations may be made without departing from the spirit and scope of the invention, as defined in the appended claims.

What is claimed is:

1. A leash handle comprising:
a rigid housing including a generally cylindrical graspable portion, a cavity, and a pivot hole;
a drawer slidably mounted in the cavity within the rigid housing to be moved from a closed position within the cavity to an open position, extending outward from the cavity to outwardly dispose an opening within the drawer
a swivel connection block including a pivot shaft pivotally mounted within the pivot hole of the rigid housing, a pivot pin and a latching pin;
an elongated leash attachment member, for the attachment of at least one individual animal leash to pivot on the elongated leash attachment member and to slide along the elongated leash attachment member between opposite ends of the elongated attachment member; wherein the opposite ends of the elongated leash attachment member are attached to the swivel connection block, and wherein the pivot shaft extends perpendicular to a line extending between the opposite ends of the elongated attachment member, wherein the elongated leash attachment member includes a pivot end, pivotally mounted on the pivot pin providing for movement of the elongated leash attachment member between an open position and a closed position, and a latching end, engaging the latching pin to hold the elongated leash attachment member in the closed position, wherein a plurality of individual animal leashes may be attached to the elongated leash attachment member and removed from the elongated leash attachment member in the open position, and wherein a plurality of individual animal leashes are held on the elongated leash attachment member in the closed position.

2. The leash handle of claim 1, wherein
the latching surface of the elongated leash attachment member comprises an inclined surface, moving past the latching pin as the elongated leash attachment member is moved into the closed position while deflecting the elongated leash attachment member, and
the elongated leash attachment member is deflected to be released from the closed position.

* * * * *